United States Patent
Blum

(10) Patent No.: US 9,480,268 B2
(45) Date of Patent: Nov. 1, 2016

(54) COMPOSITIONS FOR RETARDING SPOILAGE OF COFFEE, METHODS OF TREATING COFFEE WITH THE COMPOSITIONS AND COFFEE TREATED WITH THE COMPOSITIONS

(71) Applicant: Mel Blum, Wantagh, NY (US)

(72) Inventor: Mel Blum, Wantagh, NY (US)

( * ) Notice: Subject to any disclaimer, the term of this patent is extended or adjusted under 35 U.S.C. 154(b) by 0 days.

(21) Appl. No.: 14/700,571

(22) Filed: Apr. 30, 2015

(65) Prior Publication Data

US 2016/0088854 A1   Mar. 31, 2016

Related U.S. Application Data

(63) Continuation-in-part of application No. 14/500,165, filed on Sep. 29, 2014, now abandoned.

(51) Int. Cl.
| | |
|---|---|
| *A23B 9/26* | (2006.01) |
| *A23F 5/14* | (2006.01) |
| *A23L 3/3472* | (2006.01) |
| *C11B 5/00* | (2006.01) |

(52) U.S. Cl.
CPC . *A23B 9/26* (2013.01); *A23F 5/14* (2013.01); *A23L 3/3472* (2013.01); *C11B 5/0085* (2013.01)

(58) Field of Classification Search
CPC .......... A23B 9/26; A23B 7/154; A23F 5/10; A23F 5/14; A23F 5/145
USPC ....................................................... 426/542
See application file for complete search history.

(56) References Cited

U.S. PATENT DOCUMENTS

| | | | |
|---|---|---|---|
| 2,607,746 A | 8/1952 | Magoffin | |
| 3,492,126 A * | 1/1970 | Rubenstein | A23F 3/163 426/329 |
| 4,741,915 A * | 5/1988 | Farr | A23L 3/3463 426/542 |
| 6,228,410 B1 | 5/2001 | Zajac et al. | |
| 2005/0003043 A1* | 1/2005 | Sewalt | A23K 1/06 426/18 |
| 2005/0123628 A1* | 6/2005 | Zabrecky | A61K 31/352 424/725 |
| 2006/0003081 A1 | 1/2006 | Aquino et al. | |
| 2008/0019860 A1 | 1/2008 | Abou-Nemeh et al. | |
| 2011/0105433 A1* | 5/2011 | Braun | A23D 9/013 514/78 |
| 2012/0215016 A1 | 8/2012 | Adams et al. | |
| 2013/0196009 A1 | 8/2013 | Rajgopal et al. | |

FOREIGN PATENT DOCUMENTS

| | | |
|---|---|---|
| JP | 2007-166934 | 7/2007 |
| JP | 2009-136222 | 6/2009 |
| JP | 2009-136223 | 6/2009 |

OTHER PUBLICATIONS

M. Szymula, et al.; "A study of molecular complex formation between propylgallate and ascorbic acid in the microemulsion phase of sodium dodecyl sulfate, pentanol and water system", Science Direct, Colloids and Surfaces B: Bio Interfaces 35 (2004) 249-257.

* cited by examiner

*Primary Examiner* — Jeffrey Mornhinweg
(74) *Attorney, Agent, or Firm* — Norris McLaughlin & Marcus, P.A.

(57) ABSTRACT

A composition for retarding spoilage of coffee includes tara extract and glutathione along with propyl gallate or a synthetic antioxidant which is tert-butyl hydroquinone or butylated hydroxyanisole or ethoxyquin or ethoxyquin phosphate.

6 Claims, No Drawings

US 9,480,268 B2

COMPOSITIONS FOR RETARDING SPOILAGE OF COFFEE, METHODS OF TREATING COFFEE WITH THE COMPOSITIONS AND COFFEE TREATED WITH THE COMPOSITIONS

REFERENCE TO RELATED APPLICATION

This is a continuation-in-part of U.S. patent application Ser. No. 14/500,165, filed Sep. 29, 2014.

BACKGROUND OF THE INVENTION

This invention relates to compositions for retarding spoilage of coffee, treating coffee with the compositions and the resulting treated coffee.

Coffee is typically brewed at a high temperature, ideally about 175° F. but generally below the boiling point. Spoilage of coffee commences shortly after brewing. U.S. Pat. No. 6,228,410 (hereafter "US '410") states that the freshness of brewed coffee may be extended by provision of art antioxidant to reduce oxidation of organic matter which imparts flavor to the coffee, US '410 speculates that any number of antioxidants may be used but specifies only ascorbic acid, which it characterizes as Vitamin C, or ascorbic acid and erythorbic acid, which it characterizes as jointly being Vitamin C. US '410 suggests that Vitamin C be added to the grinds or the water from which the coffee is brewed or that the coffee maker filter be impregnated with Vitamin C. Also, the filter body or the filter may be coated with antioxidants or an antioxidant capsule or tablet may be retained under a flap to the outer surface of the filter body. Not noted in U.S. '410 is that Vitamin C when added to coffee usually imparts a sour acidic taste unless it is buffered.

Publication No. US 2008/0019860 discloses liquid monophasic lipid-soluble antioxidant compositions and processes for making the compositions. Constituents of the compositions include propyl gallate which has been dissolved in a solvent selected from the group consisting of glycerine and propylene glycol. Other antioxidants disclosed for the formulation include ascorbic acid, ascorbyl palmitate, tert-butyl hydroquinone (TBHQ), and butylated hydroxyanisole (BHA), among lists of hundreds. The lists of "antioxidants" also include citric acid and ethylenediaminetetraacetic acid (EDTA), which are not antioxidants but chelating agents intended to assist antioxidants.

Publication No. US 2013/0196009 discloses that extracts of the genus *Caesalpinia*, also known as tara, can increase DNA functionality, anti-inflammatory effects, and antioxidant effect. This publication suggests that compositions containing tara extract be administered as nutritional supplements.

SUMMARY OF THE INVENTION

According to one aspect of the present invention, it has been found that compositions comprising propyl gallate, tara extract and glutathione are remarkably effective in retarding spoilage of brewed coffee. The term "spoilage" as used herein means any deterioration of the flavor including of coffee, including acidity and staleness, as compared with coffee consumed immediately upon brewing thereof. The term "coffee" is used herein generically and includes, inter alia, regular, decaf, Robusto, Arabica and specialty coffees.

While oxidation of oils in brewed coffee contributes to spoilage of the coffee, it has been found that retardation of spoilage is not only a matter of finding appropriate antioxidants, though that, too, is very challenging because the antioxidants must not only be effective at the elevated temperatures at which coffee is brewed and held until served but must also not impair the fresh brewed coffee taste. Because too much antioxidants can readily become proxidants, a delicate balance needs to be achieved. Coffee, being a natural substance, has many constituents. It is believed that spoilage of brewed coffee is due not only to oxidation of its essential oils but also to breakdown of chlorogenic acid, caffeine, trigonelline, quinic acids, peptides, proteins, ketones, phytosterols and other substances, not involving oxidation. Such breakdown is referred to herein as "degradation" as distinguished from oxidation. Hence, retarding only oxidation of brewed coffee is not sufficiently effective in retarding spoilage of brewed coffee.

Tara extract, being natural, also is a complex mixture, including, for example, alkaloids, tannins, flavanoids, terpenoids, carbohydrates and proteins. It has been reported to have not only antioxidant activities but also anticonvulsant, anti-inflammatory, anti-proliferative, antimicrobial, anticoagulant, antiviral, and immunistimulant activities, indicating that its chemical activities are not only antioxidant but quite varied. According to the present invention, it appears that gallic acid and the gallates of tara extract contribute toward the efficacy of tara extract in retarding spoilage of brewed coffee. It is noted that the gallates in tara extract do not include propyl gallate and that, unlike, propyl gallate, gallic acid and the gallates in tara extract are not lipid (fat, oil) soluble.

It has now been found that tara extract in a formulation together with propyl gallate ("propyl gallate" herein means n-propyl gallate) makes a remarkable contribution to retarding spoilage of brewed coffee. While that contribution may, in part, be due to antioxidant activity of tara extract, it is believed that, beyond that, the remarkable contribution is due to other chemical activities of tara extract and its synergistic chemistry with other components of hereinafter described formulations.

It has also now been found that miniscule proportions of glutathione greatly enhance the effectiveness of tara extract to deter degradation of brewed coffee, far in excess of what could be expected from antioxidant activity of glutathione. It is believed that the addition of miniscule proportions of glutathione results in much greater effectiveness of the formulation in deterring degradation of brewed coffee due substantially or primarily to the glutathione acting as a catalyst in one or more chemical reactions. In which preventing oxidation is not occurring, involving constituents of the tara extract or constituents of the brewed coffee. Regardless, the remarkable contribution of miniscule proportions of glutathione to deterring degradation of brewed coffee is believed to be far greater than could be expected from any potential antioxidant effect. It appears to have a substantive catalytic effect that enhances all the other constituents of hereinafter described formulations.

Tara extract extracted with ethanol or an ethanol/water mixture containing a major proportion of ethanol, which is available as a nutraceutical, preferably is used in the present invention. The alcoholic or alcoholic/aqueous extract seems to perform in a superior fashion to the aqueous only tara extract.

Brewed coffee is often held on the burner or hot plate at the temperature at which it was brewed, typically about 175° F., for prolonged periods of time. At such temperatures, after about 30-45 minutes, deterioration of the flavor and aroma of the coffee, due to spoilage, becomes discernible. The flavor becomes astringent (acidic) and bitter as time progresses. Small quantities of formulations of the invention, e.g., 1-2 drops (0.05-0.1 ml) of the formulation per 6-8 ounces of brewed coffee prevents such spoiling of the heated brewed coffee (whether regular or decaf, Robusta or Arabica) for about 3-12 hours. The formulations of the invention are compatible with both hydophilic and hydrophobic constituents of the brewed coffee, contributing to its effectiveness.

Alternatively to adding formulations of the invention to brewed coffee, whole coffee beans or ground coffee beans may be treated with the formulations prior to packaging thereof. The coffee beans may be dipped into a formulation of the invention comprising a propylene glycol, glycerine or alcoholic solution and fully be impregnated depending on the dip time which can vary depending on the thickness and density of the skin of the beans. Alternatively, the ground, coffee may be sprayed or fogged with a formulation, of the invention comprising an alcoholic (preferably ethanol) solution which is then subsequently evacuated to remove any residual solvent that could affect taste. The latter process may be preferred for flavored ground coffees.

The formulations of the invention are neutral or very faintly sweet in flavor and convenient to use. A step in the preparation of a formulation of the invention is to dissolve propyl gallate in glycerine or propylene glycol or a mixture of glycerine and propylene glycol in any proportion of one to the other. Tara extract and glutathione, dissolved in glycerine, propylene glycol or ethanol, are admixed with the propyl gallate solution. It may be desirable to include an emulsifier or surfactant to prevent separation of propyl gallate, especially when using higher proportions of propyl gallate, as well as ascorbyl palmitate (an optional constituent), from the formulation. Emulsifiers may be selected from the Codex Alimentarius International Food Standards (the "Food Chemical Codex"), published under the auspices of The Food and Agriculture Organization of the United Nations and the World Health Organization, for example mono- and diglycerides, glyceryl monoleate, lecithin, glyceryl monolaurate and the like.

In order to help assure a neutral or very slightly sweet flavor of the formulation and to further optimize effectiveness, it is preferable to include in the formulations, according to a further aspect of the present invention, certain antioxidants meticulously selected based on the objectives of the invention. In particular, in some embodiments, formulations of the invention preferably contain at least one of citric acid, ethylene diamine tetraacetic acid (EDTA) or a salt thereof such as disodium EDTA or calcium disodium EDTA as chelants. Ascorbyl palimitate is sometimes preferred as an additional antioxidant but, if beyond its shelf life, may precipitate and necessitate filtration. The formulation may also contain a tocopherol (natural or synthetic), such as tocopherol succinate, or a tocotrienol (alpha or beta form). The citric acid or EDTA or EDTA salt functions strictly as a chelating agent, which increases antioxidant efficiency of the formulation, since any transition elemental impurities introduced into the brewed coffee from the coffee beans or the water or vessel used to brew the coffee greatly accelerate the oxidation and/or degradation process.

Instead of or in addition to glycerine or propylene glycol or a mixture thereof, an alcohol, such as food grade ethanol or isopropyl alcohol, may be used. Ethanol is preferred. For example, the use of an alcohol would be suitable if coffee (as unground beans) were to have a formulation of the invention applied thereto before packaging. Processing would include vacuum evaporating of the alcohol before packaging of the coffee.

Ethanol or Isopropyl alcohol may be used instead of or together with glycerine and/or propylene glycol as the solvent for propyl gallate, ascorbyl palmitate and tara extract.

Whereas it may be convenient to initially dissolve the propyl gallate, tara extract and glutathione together in the aforementioned solvents (whether glycerine, propylene glycol, ethanol or isopropyl alcohol or some mixture thereof), it is noted that, unlike propyl gallate, tara extract and glutathione are slightly soluble in water in the proportions in which they can be used in the formulations of the invention.

DETAILED DESCRIPTION OF THE INVENTION

Surprisingly, but confirmed by testing, including taste tests, very small proportions of tara extract in the formulations greatly increase the effectiveness of the formulations in deterring deterioration of the flavor, i.e., retarding spoilage, of brewed coffee, even brewed coffee being held at an elevated temperature, typically about 175° F., over a period of time, and, also surprisingly, even smaller proportions of glutathione together with the tara extract further greatly increase the effectiveness of the formulations. The tara extract content of the formulation, by weight based on the total weight of propyl gallate and tara extract in the formulation, may be only 0.01-5% and preferably is 0.1-0.5%. The proportion of glutathione in formulations of the invention is preferably 10-25 parts by weight per million parts by weight of the tara extract in the formulation.

Propyl gallate and ascorbyl palmitate are insoluble or only slightly soluble in water even when the water is at an elevated temperature. It has been found that direct heating, i.e., heating by application of a hot medium (e.g., a flame, electric plate, heated air or other heated gas, or steam) to a vessel containing propyl gallate and/or ascorbyl pamitate in glycerine and/or propylene glycol or ethanol or isopropyl alcohol in order to dissolve the propyl gallate and ascorbyl palmitate results in dissolution but with substantial decomposition of the propyl gallate and/or ascorbyl palmitate. It has now also been found that, heating by short term application of microwave energy often avoids the problem. For example, in a small scale experiment using a conventional household microwave oven set at full power for one minute, successful dissolution without any decomposition or inter-reactions was repeatedly attained. The resultant solution of propyl gallate and/or ascorbyl palmitate becomes itself then more water soluble. That solution as well as the other constituents of the formulation can be admixed with water to produce a formulation of the invention in the form of a solution for retarding spoilage of coffee.

The tara plant and its pods are indigenous to the Amazon region. "Tara extract", identified by that name, is available from Peru, Ecuador, Chile, Brazil and Bolivia. Tara extract is also available in commercial quantities from other suppliers, and methods of producing it are well known. For example, the methods of producing tara extract and sources of tara extract disclosed in U.S. Published Patent Application 2013/0302265 are suitable for producing tara extract for the present invention as are any other methods of producing and sources of tara extract. Especially preferred for the present invention are tara extracts which are alcoholic extracts rather than aqueous extracts.

Any water used in formulations of the invention is preferably deionized or distilled.

The term "alcohol" as used herein encompasses any food grade approved alcohol (non-denatured) listed in the above referred to Food Chemical Codex.

In another, less preferred, embodiment of the invention, synthetic antioxidants such as butylated hydroxyanisole (BHA), which is soluble in, for example, glycerol, propylene glycol or ethanol, and/or tert-butyl hydroquinone (TBHQ) or ethoxyquin (ethoxyquin of >99% purity being highly preferred as compared with grades of lesser purity), which also are soluble in, for example, glycerol, propylene glycol or ethanol, may be used instead of propyl gallate and ascorbyl palmitate. Instead of ethoxyquin, ethoxyquin phosphate, which is water soluble may be used. It is highly preferred that the ethoxyquin phosphate be prepared from ethoxyquin of >99% purity. However, the use of synthetic antioxidants in any formulation disqualifies the formulation from being considered natural or organic.

In all formulations of the invention, tara extract and glutathione are critical components. The glutathione apparently functions as a catalyst.

Examples of coffee spoilage retarding formulations of the present invention, wherein the proportions are by weight and proportions are based on total weight of the formulation unless otherwise stated, are:
 a) 0.55-5% propyl gallate;
 b) 0.01-0.5% tara extract;
 c) 10-25 parts by weight of glutathione per million parts by weight of the tara extract;
 d) 0.1-1% of at least one of citric acid which is hydrated or anhydrous (calculated based on anhydrous), ethylenediamine tetraacetic acid (EDTA) or a salt of EDTA;
 e) 0.1-1% buffered ascorbic acid;
 f) optionally 0.5-1% ascorbyl palmitate; and
 g) balance glycerine, propylene glycol, ethanol or isopropyl alcohol or a mixture of any two or more thereof, and, optionally, water and emulsifier or surfactant.

These formulations are preferred because all the constituents, except EDTA or a salt thereof, therein may be made from natural ingredients.

Alternative formulations according to the invention but which are not "natural" and wherein again the proportions are by weight and proportions are based on total weight of the formulation unless otherwise stated, are:
 a) 0.1-1% of tert-butyl hydroquinone (TBHQ) or butylated hydroxyanisole (BHA) or ethoxyquin or ethoxyquin phosphate;
 b) 0.01-1.0%, preferably 0.1-0.5%, tara extract;
 c) 10-25 parts by weight glutathione per million parts by weight of the tara extract;
 d) 0.5-1% of at least one of citric acid (hydrated or anhydrous, calculated based on anhydrous), ethylenediamine tetraacetic acid (EDTA) or a salt of EDTA;
 e) 0.2-1.5% buffered ascorbic acid; and
 f) balance, glycerine, propylene glycol, ethanol or isopropyl alcohol or a mixture of any two or more thereof, water, and, optionally, surfactant, or emulsifier.

The TBHQ or BHA is dissolved in the propylene glycol, glycerine, ethanol or isopropyl alcohol, the resultant solution being somewhat water soluble and being admixed in water with the other constituents to produce the coffee spoilage retarding formulation in the form of a solution. A surfactant, or an emulsifier such as those noted hereinabove, may be needed to enhance solubility.

All of the above formulations may contain additional constituents. Preferred is 0.1-0.25% of a tocopherol (natural or synthetic), especially tocopherol succinate, or 0.01-0.5% of a tocotrienol (alpha, or beta form) as an optional additional constituent which further enhances the formulation. These proportions are by weight, based on total weight of the formulations. The tocopherol or tocotrienol, when used in a formulation is first dissolved in the aforementioned solvent (glycerine and/or propylene alcohol, optionally admixed with ethanol or isopropyl alcohol).

Whereas, for example, a formulation of the invention in which the solvents are only ethanol and water may be ultrasonically or fogger coated onto, impregnated into or admixed with ground or whole coffee beans and then vacuum evaporated to remove the ethanol and water. The formulations of the invention are particularly convenient and practical when packaged with a dropper, pump, measuring cap, measuring spoon, pipette or other measuring implement for addition of measured amounts of the formulations to brewed coffee. For example, one or two drops (0.05-0.1 ml) of a formulation of the invention per 6-8 ounce cup of coffee will usually suffice, whereby a four fluid ounce bottle of the formulation is sufficient for over two thousand cups of coffee.

The coffee may be in any form, such as "regular" (caffeine-containing or decaffeinated) coffee with or without milk, sweetener, cream, liqueur or the like, espresso, cappuccino, latte, iced coffee and so forth.

Formulations of the invention may be added to coffee before, during or just after brewing.

Brewed coffee spoils even when not at elevated temperatures though that takes somewhat longer than at elevated temperatures. Therefore, utility of formulations of the invention is not limited to brewed coffee at elevated temperatures.

The remarkable enhancement of effectiveness in deterring deterioration of flavor (i.e., retarding spoilage) of coffee even when subjected to prolonged heating by the inclusion of small proportions of tara extract and glutathione in formulations of the invention is surprising. The combination of tara extract and glutathione, apart from any antioxidant effect, is believed to deter flavor-impairing degradation of coffee constituents by chemical mechanisms other than antioxidation, such as catalysis or stabilization, whereas antioxidation primarily addresses essential oil spoilage.

What is claimed is:

1. A method of retarding spoilage of coffee, comprising applying thereto or admixing therewith a solution comprising, all by weight, and based on total weight of the solution unless otherwise stated:
 a) 0.55-5% propyl gallate;
 b) 0.01-0.5% alcohol or alcohol/water extract of tara;
 c) 10-25 parts by weight of glutathione per million parts by weight of the tara extract;
 d) 0.1-1% of at least one of citric acid which is hydrated or anhydrous, proportion thereof calculated based on anhydrous, ethylenediamine tetraacetic acid (EDTA) or a salt of EDTA;
 e) 0.1-1% buffered ascorbic acid;
 f) optionally 0.5-1% ascorbyl palmitate; and
 g) balance glycerine, propylene glycol, ethanol or isopropyl alcohol or a mixture of any two or more thereof, and, optionally, water and emulsifier or surfactant.

2. A method of retarding spoilage, of coffee, comprising applying thereto or admixing therewith a solution comprising, all by weight, and based on total weight of the solution unless otherwise stated:
 a) 0.1-1% of tert-butyl hydroquinone (TBHQ) or butylated hydroxyanisole (BHA) or ethoxyquin or ethoxyquin phosphate;
 b) 0.01-1.0% alcohol or alcohol/water extract of tara;

c) 10-25 parts by weight glutathione per million parts by weight of the tara extract;
d) 0.5-1% of at least one of citric acid which is hydrated or anhydrous, proportion thereof calculated based on anhydrous, ethylenediamine tetraacetic acid (EDTA) or a salt of EDTA;
e) 0.2-1.5% buffered ascorbic acid; and
f) balance glycerine, propylene glycol, ethanol or isopropyl alcohol or a mixture of any two or more thereof, water, and, optionally emulsifier or surfactant.

3. The method of claim 2, wherein tara extract comprises 0.1-0.5% of the solution.

4. Coffee treated by the method of claim 1.

5. Coffee treated by the method of claim 2.

6. Coffee treated by the method of claim 3.

* * * * *